（12）United States Patent
Shao et al.

(10) Patent No.: US 8,219,564 B1
(45) Date of Patent: Jul. 10, 2012

(54) TWO-DIMENSIONAL INDEXES FOR QUICK MULTIPLE ATTRIBUTE SEARCH IN A CATALOG SYSTEM

(75) Inventors: Minglong Shao, Sunnyvale, CA (US); Andrew Leung, Pleasanton, CA (US); Shankar Pasupathy, Sunnyvale, CA (US); Timothy Clayton Bisson, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 554 days.

(21) Appl. No.: 12/111,530

(22) Filed: Apr. 29, 2008

(51) Int. Cl.
*G06F 7/00* (2006.01)
*G06F 17/30* (2006.01)

(52) U.S. Cl. ...................................... 707/743
(58) Field of Classification Search .................. 707/741, 707/743
See application file for complete search history.

(56) References Cited

U.S. PATENT DOCUMENTS

| | | | |
|---|---|---|---|
| 4,570,217 A | 2/1986 | Allen et al. |
| 4,876,643 A | 10/1989 | McNeill et al. |
| 5,124,987 A | 6/1992 | Milligan et al. |
| 5,163,131 A | 11/1992 | Row et al. |
| 5,202,979 A | 4/1993 | Hillis et al. |
| 5,278,979 A | 1/1994 | Foster et al. |
| 5,403,667 A | 4/1995 | Simoens |
| 5,581,724 A | 12/1996 | Belsan et al. |
| 5,742,817 A | 4/1998 | Pinkoski |
| 5,819,292 A | 10/1998 | Hitz et al. |
| 6,009,481 A | 12/1999 | Mayer |
| 6,061,770 A | 5/2000 | Franklin |
| 6,081,875 A | 6/2000 | Clifton et al. |
| 6,192,408 B1 | 2/2001 | Vahalia et al. |
| 6,230,200 B1 | 5/2001 | Forecast et al. |
| 6,341,341 B1 | 1/2002 | Grummon et al. |
| 6,560,615 B1 | 5/2003 | Zayas et al. |
| 6,636,908 B1 | 10/2003 | Winokur et al. |
| 6,671,773 B2 | 12/2003 | Kazar et al. |
| 6,701,307 B2 * | 3/2004 | Himmelstein et al. ........ 707/743 |
| 6,707,818 B1 | 3/2004 | Kadambi et al. |
| 6,735,636 B1 | 5/2004 | Mokryn et al. |
| 6,751,219 B1 | 6/2004 | Lipp et al. |
| 6,895,413 B2 | 5/2005 | Edwards |
| 6,993,027 B1 | 1/2006 | Kadambi et al. |
| 7,099,866 B1 | 8/2006 | Crosbie et al. |
| 7,103,616 B1 | 9/2006 | Harmer et al. |
| 7,107,273 B2 | 9/2006 | Ohata et al. |

(Continued)

OTHER PUBLICATIONS

U.S. Appl. No. 11/324,429, filed Jan. 2006, Pasupathy et al.

(Continued)

*Primary Examiner* — Kimberly Lovel
*Assistant Examiner* — Mariela Reyes
(74) *Attorney, Agent, or Firm* — Cesari and McKenna, LLP

(57) ABSTRACT

Embodiments of the present invention provide mechanisms that overcome limitations of existing indexes by creating two-dimensional (2D) spatial indexes to quickly locate data containers that match two or more predicates. This is accomplished by representing metadata attributes describing a data container as dimensions in a 2D space so that a data container can be expressed as a point or a cell in a 2D space with coordinates being a pair of values of the selected attributes. A space filling curve is used to traverse the 2D space and convert each pair of the 2D coordinates to a single space filling curve value. A 2D spatial index is then created based on the computed space filling curve values so that one value can be associated with one or more points (data containers) in the index. Advantageously, the created spatial index provides for searching and processing fewer metadata entries, thereby decreasing the time typically used to search for data.

20 Claims, 18 Drawing Sheets

U.S. PATENT DOCUMENTS

| | | | |
|---|---|---|---|
| 7,127,577 | B2 | 10/2006 | Koning et al. |
| 7,162,473 | B2 | 1/2007 | Dumais et al. |
| 7,227,862 | B2 | 6/2007 | Kalkunte et al. |
| 7,310,332 | B2 | 12/2007 | Kadambi et al. |
| 7,313,720 | B1 | 12/2007 | Eng et al. |
| 7,340,639 | B1 | 3/2008 | Lee et al. |
| 7,383,288 | B2 | 6/2008 | Miloushev et al. |
| 7,386,546 | B1 | 6/2008 | Sentry et al. |
| 7,440,467 | B2 | 10/2008 | Gallatin et al. |
| 2002/0034187 | A1 | 3/2002 | Kalkunte et al. |
| 2002/0083037 | A1 | 6/2002 | Lewis et al. |
| 2003/0004938 | A1* | 1/2003 | Lawder .............................. 707/3 |
| 2003/0182322 | A1 | 9/2003 | Manley et al. |
| 2003/0182389 | A1 | 9/2003 | Edwards |
| 2004/0030668 | A1 | 2/2004 | Pawlowski et al. |
| 2004/0054748 | A1 | 3/2004 | Ackaouy et al. |
| 2004/0174898 | A1 | 9/2004 | Kadambi et al. |
| 2005/0015354 | A1 | 1/2005 | Grubbs et al. |
| 2005/0246401 | A1 | 11/2005 | Edwards et al. |
| 2005/0246612 | A1 | 11/2005 | Leis et al. |
| 2005/0271065 | A1 | 12/2005 | Gallatin et al. |
| 2006/0010299 | A1 | 1/2006 | Zhang et al. |
| 2006/0265497 | A1 | 11/2006 | Ohata et al. |
| 2006/0277221 | A1 | 12/2006 | Zavisca et al. |
| 2006/0288026 | A1 | 12/2006 | Zayas et al. |
| 2007/0094465 | A1 | 4/2007 | Sharma et al. |
| 2007/0214409 | A1* | 9/2007 | Miyata .......................... 715/520 |
| 2008/0016037 | A1* | 1/2008 | Enomoto et al. ................... 707/3 |
| 2008/0021902 | A1 | 1/2008 | Dawkins et al. |
| 2008/0086464 | A1* | 4/2008 | Enga ................................ 707/4 |
| 2009/0204597 | A1* | 8/2009 | Mani et al. ......................... 707/5 |

OTHER PUBLICATIONS

U.S. Appl. No. 11/590,381, filed Oct. 2006, Goodson et al.
Akyurek, Sedat, Placing Replicated Data to Reduce Seek Delays, Department of Computer Science, University of Maryland, UMIACS-TR-91-121, CS-TR-2746, Aug. 1991.
Bitton, Dina, Disk Shadowing, Proceedings of the 14.sup.th VLDB Conference, LA, CA (1988), 8 pages.
Chaudhuri, Surajit, et al., Self-Tuning Technology in Microsoft SQL Server, Data Engineering Journal 22, Feb. 1999 pp. 20-27.
Chutani, Sailesh, et al., The Episode File System, In Proceedings of the USENIX Winter 1992, 18 pages.
Coyne, Robert A., et al., Storage Systems for National Information Assets, Proc. Supercomputing 92, Minneapolis, Nov. 1992, pp. 626-633.
Finlayson, Ross S., et al., Log Files: An Extended File Service Exploiting Write-Once Storage Department of Computer Science, Stanford University, Report No. STAN-CS-87-1177, Sep. 1987, 14 pages.
Gray, Jim, et al., The Recovery Manager of the System R Database Manager, ACM Computing Surveys, (13)2:223-242 1981, 20 pages.
Hecht, Matthew S., et al. Shadowed Management of Free Disk Pages with a Linked List, ACM Transactions on Database Systems, 8/4, Dec. 1983, pp. 503-514.
Hitz, Dave et al., File System Design for an NFS File Server Appliance, Technical Report 3002, Rev. C395, presented Jan. 19, 1994, 23 pages.
Howard, John H, et al., Scale and Performance in a Distributed File System, Carnegie Mellon University, CMU-ITC-87-068, Aug. 5, 1987, 33 pages.
Howard, John H., An Overview of the Andrew File System, Carnegie Mellon University, CMU-ITC-88-062 1988, 6 pages.
Howard, John, H. et al., Scale and performance in a distributed file system, ACM Trans. Computer. System., 6(1), Feb. 1988 pp. 51-81.
Kazar, Michael L., Synchronization and Caching Issues in the Andrew File System, Carnegie Mellon University, CMU-ITC88-063, 12 pages.
Kazar, Michael L., et al., Decorum File System Architectural Overview, USENIX Summer Conference, Anaheim, California, 1990, 13 pages.
Kemper, Alfons, et al., Performance Tuning for SAP R/3, Data Engineering Journal 22, Feb. 1999 pp. 33-40.
Kent, Jack et al., Optimizing Shadow Recovery Algorithms, IEEE Transactions on Software Engineering, 14(2): 155-168, Feb. 1988.
Kistler, et al., Disconnected Operation in the Coda File System, ACM Transactions on Computer Systems, vol. 10, No. 1, Feb. 1992, pp. 3-25.
Kourai, Kenichi, et al., "HyperSpector: Virtual Distributed Monitoring Environments for Secure Intrusion Detection", ACM, Jun. 2005, pp. 197-207.
Lorie, Raymond, A, Physical Integrity in a large segmented database, ACM Trans. Database Systems, 2(1): 91-104, Mar. 1977.
Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.
Patterson, D., et al., A Case for Redundant Arrays of Inexpensive Disks (RAID), Technical Report, CSD-87-391, Computer Science Division, Electrical Engineering and Computer Sciences, University of California at Berkeley (1987), 26 pages.
Patterson, D., et al., A Case for Redundant Arrays of Inexpensive Disks (RAID), SIGMOD International Conference on Management of Data, Chicago, IL, USA, Jun. 1-3, 1988, SIGMOD Record (17):3:109-16 (Sep. 1988).
Peterson, Zachary Nathaniel Joseph, Data Placement for Copy-on-Write Using Virtual Contiguity, University of CA, Santa Cruz, Master of Science in Computer Science Thesis, Sep. 2002.
Quinlan, Sean, A Cached WORM File System, Software-Practice and Experience, 21(12):1289-1299 (1991).
Rosenblum, Mendel, et al. The Design and Implementation of a Log-Structured File System Jul. 24, 1991 pp. 1-15.
Rosenblum, Mendel, The Design and Implementation of a Log-Structured File System, 1992, pp. 1-93.
Rosenblum, Mendel, et al., The Design and Implementation of a Log-Structured File System, In Proceedings of ACM Transactions on Computer Systems, (10)1:26-52, Feb. 1992.
Rosenblum, Mendel, et al., The LFS Storage Manager, Computer Science Division, Electrical Engin. And Computer Sciences, Univ. of CA, presented at Summer '90 USENIX Technical Conference, Anaheim, CA Jun. 1990, 16 pages.
Schiefer, Berni, et al., DB2 Universal Database Performance Tuning, Data Engineering Journal 22, Feb. 1999 pp. 12-19.
Seltzer, Margo I., et al., Journaling Versus Soft Updates: Asynchronous Meta-Data Protection in File Systems, Proceedings of 200 USENIX Annual Technical Conference, Jun. 18-23, 2000.
Shasha, Dennis, Tuning Time Series Queries in Finance: Case Studies and Recommendations, Data Engineering Journal 22, Feb. 1999 pp. 41-47.
Sidebotham, Bob, Volumes: The Andrew File System Data Structuring Primitive, EEUG Conference Proceedings, Manchester, UK, Autumn 1986.
Subramanian, Muralidhar, et al., Performance Challenges in Object-Relational DBMSs, Data Engineering Journal 22, Feb. 1999 pp. 28-32.
Weikum, Gerhard, et al., Towards Self-Tuning Memory Management for Data Servers, Data Engineering Journal 22, Feb. 1999 pp. 3-11.
West, Michael, et al. The ITC Distributed File System: Prototype and Experience, Carnegie-Mellon University, Technical Report CMU-ITC-040, Mar. 1985, 17 pages.
Zayas, Edward R., AFS-3 Programmer's Reference: Architectural Overview, Transarc Corporation, Pittsburgh, PA, 1.0 edition 1991, 37 pages.

* cited by examiner

100

400

TWO-DIMENSIONAL INDEXES FOR QUICK MULTIPLE ATTRIBUTE SEARCH IN A CATALOG SYSTEM

FIELD OF THE INVENTION

The present invention relates to generating search indexes, and more specifically to generating and querying spatial indexes.

BACKGROUND

Metadata of data containers (such as files and logical units stored at a storage system) includes multiple attributes (e.g., size, owner of the data container, location on storage device, modification time, etc.). Storage administrators can query metadata to obtain useful information about data containers that can help them make decisions regarding various storage management tasks. Typical queries may ask questions, such as "what data container type takes the most space?", "what are data containers that are deleted since yesterday?", or "how many data containers stored on expensive disks have never been accessed since last year?" Quick answers to these questions can help storage administrators to understand how storage resources are used. Since a large number of attributes is stored (e.g., from millions to billions) on storage devices, searching the attributes in a timely fashion can become a challenging task.

Current solutions to accelerate search for multi-attribute queries (e.g., queries based on more than one attribute) could be classified into two categories: using single attribute indexes and multi-attribute indexes. An index is a data structure having a plurality of keys, with each key identifying a data record. A single attribute index is an index created based on a single attribute. Thus, if a query includes more than one attribute on which the query needs to match (such as a data container size and modification time) and an index exists for each searchable attribute (one for the data container size attribute and the other for the modification time), each index is searched separately. Then, a logical operation, such as intersection, is applied to the results of both searches to find the attributes that match both predicates in the query. In another approach, if the index is created only for one searchable attribute, that index is searched first. Then, the second predicate can be used to filter the records that do not match the second predicate. Both approaches are inefficient, however, in metadata attribute searches in which the number of data containers that match multiple predicates (or conditions) is less than the number of data containers that match a single predicate. Thus, these approaches do not take advantage of the combined selectivity of multiple predicates in a query, which is usually lower than any single predicate selectivity. Lower selectivity means fewer index entries to scan and process, thereby reducing the need to search unwanted data records and to make unnecessary, time consuming disk requests.

Multi-attribute indexes, also known as multicolumn or composite indexes, are indexes built on multiple attributes. They can be viewed as sorted arrays containing values that are created by concatenating the values of indexed columns/attributes. Therefore, the concatenating order of the columns determines how "important" a column is. Typically, the first column is the most important one. One of the limitations of existing composite indexes is that a composite index first uses predicates on the first attribute to find a list of records that match the first attribute, then uses predicates on other attributes to obtain a final matching list. For queries that have predicates on the first column, especially when those predicates are selective (i.e., they better eliminate unwanted records), multi-attribute indexes are useful and can help reduce the amount of index entries to be scanned and examined. However, for other queries, in which the first predicate is not the most selective one, multiple index entries are searched first based on the first attribute in the composite index. Then, the resulting list is searched based on the subsequent portion of the composite index. This, in turn, results in searching unnecessary multiple index entries. Due to this limitation, multi-attribute indexes are typically used sparingly.

Accordingly, what is needed is a mechanism that will reduce inefficiencies of existing mechanisms for searching metadata of data containers.

SUMMARY OF THE INVENTION

Embodiments of the present invention provide mechanisms that overcome limitations of existing single-attribute and multi-attribute indexes by creating two-dimensional (2D) spatial indexes that result in searching fewer index entries in response to a query on two or more metadata attributes. An index represents a data structure having a plurality of keys, each key identifying a data container (such as a file or a logical unit). To create a 2D index, selected metadata attribute pairs describing a data container are represented as dimensions in a 2D space. A grid is imposed on the 2D space so that a data container can be expressed as a cell in a 2D space. Coordinates of each cell (or a data container) represent a pair of values of the metadata attributes for a particular data container. A space filling curve (non-intersecting linear curves that pass each cell of the 2D space once) is applied to traverse the 2D space and convert each pair of the 2D coordinates to a space filling curve value. Each value is inserted into a sorting data structure (e.g. index) as a key. When a query based on two or more attributes (for which an index is created) is received, space filling curve values are computed for a region in the 2D space that includes all possible query matches. A novel optimization technique is utilized to decrease a number of computations to be performed to compute such values. The computed space filling curve values are used as keys to search the index for data containers matching the query on two or more metadata attributes.

Advantageously, the created 2D spatial index overcomes limitations of existing single-attribute indexes since it utilizes combined selectivity (i.e., it allows to search for multiple attributes at the same time). The created spatial index overcomes limitations of existing multi-attribute indexes since it does not assign importance to attributes. Specifically, spatial indexes according to embodiments of the present invention do not take into consideration the order of an attribute in the index. As a result, fewer index entries are processed thereby decreasing the time typically used to search for data.

Other aspects of the invention will become apparent from the following detailed description taken in conjunction with the accompanying drawings, which illustrate the principles of the invention by way of example.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

System Environment

Figure 1:
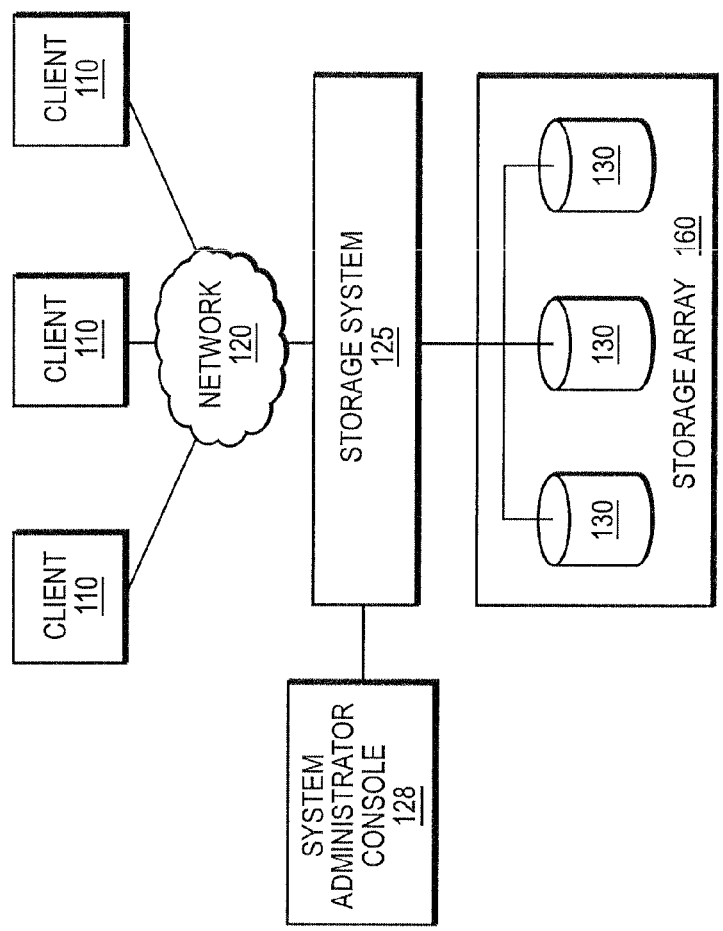
FIG. 1 is a diagram of environment within which embodiments of the present invention can be implemented.

FIG. 1 is a schematic block diagram of storage system environment 100 that may be used with the present invention. The storage system environment 100 comprises one or more storage systems 125 interconnected with a plurality of clients 110 via network 120. For ease of description, only one storage system is shown in FIG. 1. Storage system 125 is connected to one or more storage devices onto which data may be stored, and from which data may be obtained, as desired. The storage system 125 may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device.

In operation, the storage system 125 services data access requests from the client system (client) 110. Each client 110 may be a general-purpose computer configured to execute applications and interact with the storage system 125 in accordance with a client/server model of data delivery. That is, the client 110 may request the services of the storage system 125, and the storage system may return the results of the services requested by the client by exchanging packets over the network 120. The clients 110 may issue packets including file-based access protocols, such as the Common Internet File System (CIFS) protocol or Network File System (NFS) protocol, over TCP/IP when accessing data in the form of data containers, such as files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing data in the form of data containers, such as blocks. Also, connected to the storage system 125 are one or more storage devices, such as disks 130 organized as a storage array 160. Storage system 125 can be connected to a system administrator console 128, such as a monitor with a keyboard. Storage administrators can query metadata to obtain useful information about data containers that can help them make decisions regarding various storage management tasks.

Storage system 125 may implement a file system 1140 (as will be described in more detail herein with reference to FIG. 11). In one embodiment, the file system stores data containers (such as files) on disks as blocks, for example, using, e.g., 4 kilobyte (KB) data blocks, and using modes to describe the data containers. An mode is a data structure, e.g., a 128-byte structure, which may be used to store metadata about a data container. Metadata describes a data container and may include a number of attributes, such as ownership of the data container, access permission for the data container, size of the data container, data container type and location of the file on disk, as described below. An mode number refers to a pointer of an mode data structure.

Figure 2:
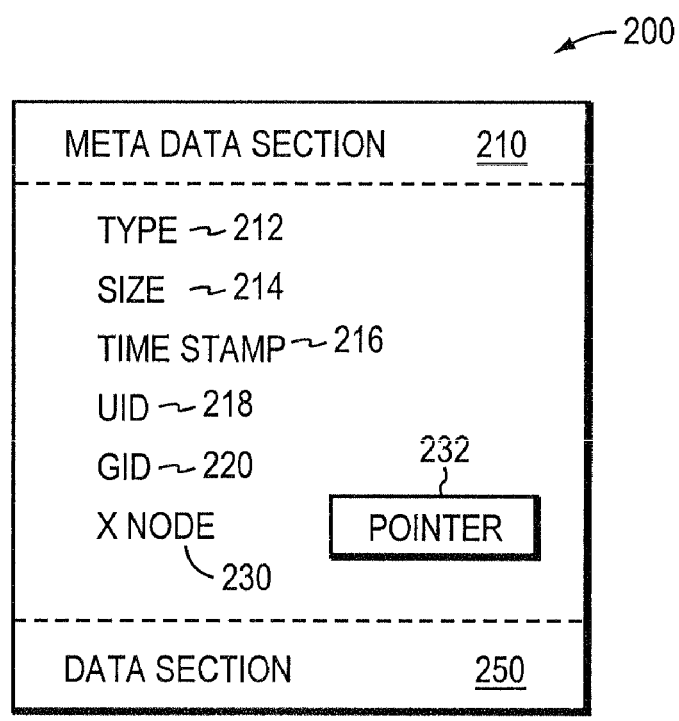
FIG. 2 is a block diagram of mode data structure including metadata attributes describing a data container stored at a storage system shown in FIG. 1.

Referring now to FIG. 2, it illustrates an exemplary mode structure 200 used according to embodiments of the present invention. Inode data structure 200 may include a metadata section 210 and a data section 250. The information stored in metadata section 210 of each mode describes a data container and, as such, may include the following attributes: the data container type (e.g., regular or directory) 212, size 214 of the data container, time stamps 216 (e.g., access and/or modification) for the data container, ownership, i.e., user identifier (UID 218) and group ID (GID 220), of the data container, as well as other attributes. Those skilled in the art would understand that metadata section may include other attributes, which are not shown in FIG. 2. The metadata section 210 further includes a x-inode field 230 with a pointer 232 that references another on-disk inode structure containing, e.g., access control list (ACL) information associated with the data container or directory.

As described herein, system administrators may often issue queries to metadata to search for data that match predicates (conditions of the query) on multiple attributes. For example, the query "How much space is taken by ".mp3" data containers under the "/home" directory?" has two predicates on two data container attributes: "data container extension"="mp3" and "path name"="/home". The query "What are Alice's files that have been modified in the last 5 days?" asks for data containers that match two predicates on two attributes: "owner"="Alice" and "modification time"="last 5 days". As described herein, existing single attribute and multiple attribute indexes fall short of providing efficient search mechanisms. Briefly, embodiments of the present invention provide mechanisms that overcome limitations of existing single-attribute and multi-attribute indexes by creating two-dimensional (2D) spatial indexes to quickly locate data containers that match two or more predicates and to reduce a number of index entries to process. This is accomplished by representing metadata attribute pairs describing a data container as dimensions in a 2D space so that a data container can be expressed as a point or a cell in a 2D space with coordinates being a pair of values of the selected attributes. For example, a data container that is modified by user1 at timestamp1 is a point at the coordinates of (timestamp1, user1) (or (user1, timestamp1)). A space filling curve (non-intersecting linear curves that pass each cell of the 2D space once) is utilized to traverse the 2D space and to convert each pair of the 2D coordinates to a single space filling curve value. A 2D spatial index is then created based on the computed space filling curve values so that each value represents a key in the index and each value can be associated with one or more data containers. Accordingly, searching the index based on the computed values results in locating points at coordinates corresponding to data containers in a 2D space. As will be described in more detail herein, space-filling curve values can be used as keys to search for data containers using the created spatial index. Since the created indexes can be used to search for records that match on two predicates, the indexes provide for lower selectivity, i.e., fewer index entries can be scanned and processed. Furthermore, unlike existing multi-attribute indexes, the created spatial index does not assign "importance" to a particular attribute since all attributes in the query are equal. These mechanisms will be described in greater detail in reference to FIG. 3.

Creating an Index

Figure 3:
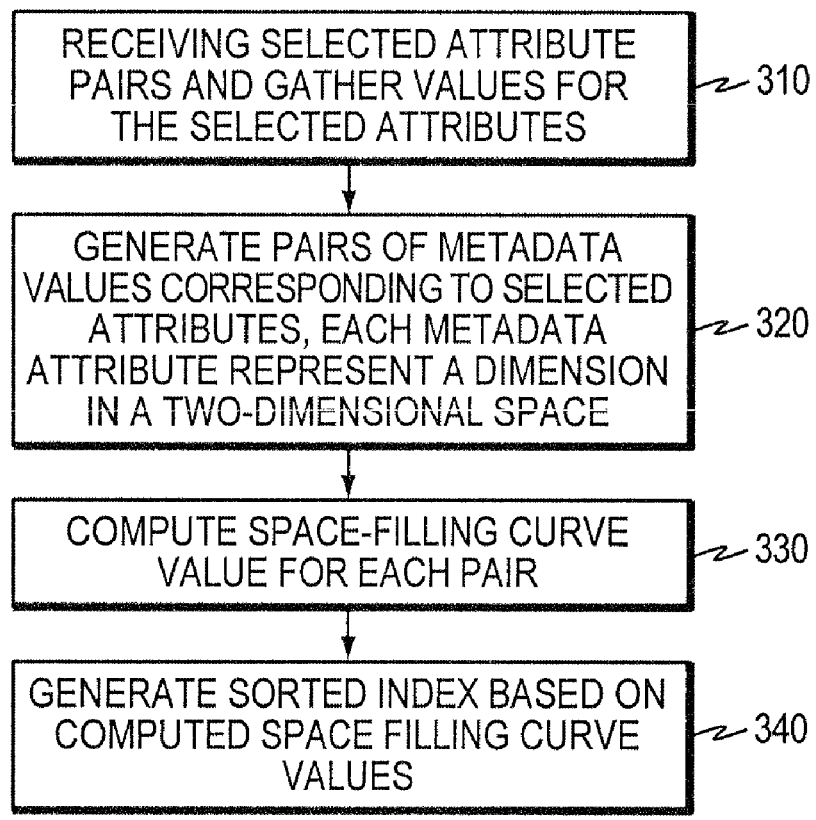
FIG. 3 is a flowchart of a method for creating an index for searching metadata of data containers in a storage system based on selected attributes according to embodiments of the present invention.

Referring now to FIG. 3, it illustrates a flowchart of a method for creating an index for searching metadata of data containers in a storage system based on selected attribute pairs according to embodiments of the present invention. Briefly, metadata attributes for which index to be created are received by a catalog system (shown in FIG. 11). A 2D space is created so that the selected attributes represent dimensions in the 2D space. A grid is imposed on the 2D space so that a data container can be expressed as a cell in a 2D space. Coordinates of each cell (or a data container) represent a pair of values of the selected metadata attributes for a particular data container. A space filling curve is applied to traverse the 2D space and to convert each pair of the coordinates to a space filling curve value. A 2D spatial index is then created based on the computed space filling curve values so that each value represents a key in the 2D spatial index.

Initially, storage system 125 receives metadata attribute pairs (selected by a system administrator) on which a spatial 2D index will be created (step 310). A system administrator can make decisions as to which attributes to select based on the prediction of the future workloads (for example, attribute combinations that will appear together frequently in the future queries can be chosen to create an index). Storage system 125 may receive the selected attributes from the system administrator via a console 128 or a web-based interface (not shown). Storage system 125 implements an attribute collecting module 1120 (shown in more detail in FIG. 11) to search inode data structures 200 on storage devices to gather all values for the selected attribute pairs for all inodes. In one implementation, attribute collecting module 1120 stores the collected values in memory (such as memory 1010 shown in FIG. 10). Then index generation module (shown in more detail in FIG. 11) reads the stored values. In another implementation, attribute collecting module provides the values directly to the index generation module 1110 along with an inode number associated with a data container whose attribute values have been gathered. Exemplary attribute values provided to index generation module 1110 (or read by index generation module 1110 from memory) are shown in Table 1:

TABLE 1

Exemplary Attribute Values for Attribute 1 (Size) and Attribute 2 (UID) Used by Index Generation Module

| Inode Number | Attribute 1 (size) | Attribute 2 (UID) |
| --- | --- | --- |
| 4 | 0 | 1 |
| 6 | 0 | 1 |
| 3 | 1 | 0 |

TABLE 1-continued

Exemplary Attribute Values for Attribute 1 (Size) and Attribute 2 (UID) Used by Index Generation Module

| Inode Number | Attribute 1 (size) | Attribute 2 (UID) |
| --- | --- | --- |
| 2 | 1 | 1 |
| 1 | 1 | 1 |

Figure 4:
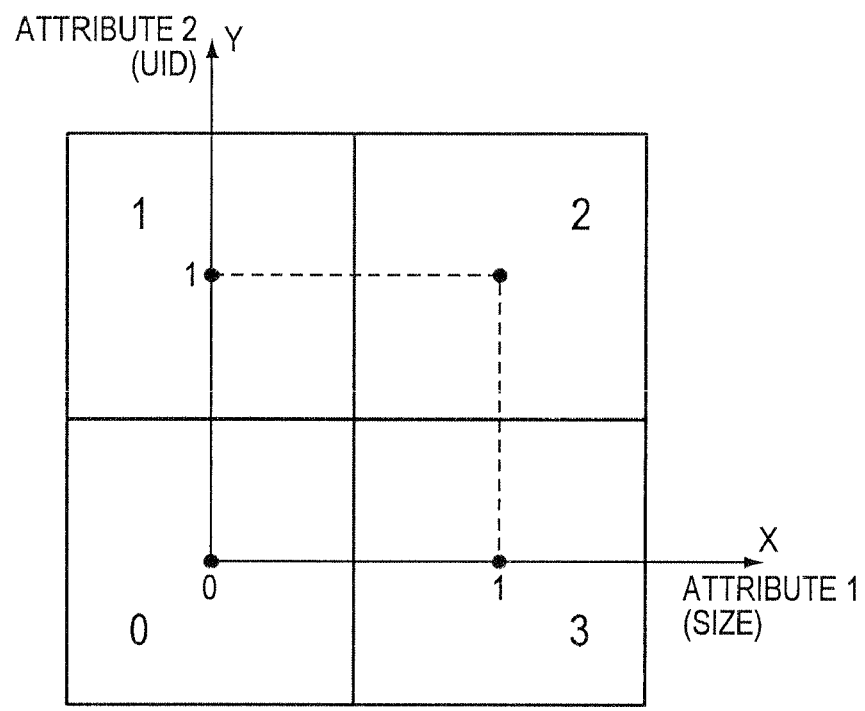
FIG. 4 is a diagram that represents pairs of metadata values in a two-dimensional space according to embodiments of the present invention.

The index generation module 1110 represents the selected attributes as the two dimensions in a 2D space (step 320). As an example, user identification (UID) and data container size can be selected as the two attributes on which an index will be created. Index generation module 110 creates a 2D space with the two attributes representing two dimensions in a 2D space. For example, as shown in FIG. 4, attributes "UID" and "size" can be represented as two dimensions of a 2D space. In FIG. 4, "size" attribute is an X dimension in 2D space and "UID" attribute is a Y dimension in the 2D space. Those skilled in the art would understand that a particular attribute could be represented either as X or Y dimension in the 2D space. A data container, thus, is a point in the 2D space with its coordinates being a pair of values of the two attributes. For example, a data container having size 1 KB that is owed by a user having UID=1 is a point at the coordinates of (UID, Size) or (Size, UID). These coordinates can be represented by discreet integers. A discrete integer has quantities of a finite number.

Numerical attributes, such as data container size, UID, and timestamps, are integer values that do not need any further processing. All other attributes that are not expressed by integers (such as data container extensions) are converted to integers. In one implementation, non-integer attributes can be converted to integers by using a mapping table 1135 (shown in FIG. 11), which maps non-integer attribute values and integer numbers. For example, the extension of "doc" maps to 1, the extension of "cpp" maps to 2, etc. The mapping table can be updated when extensions are added or deleted.

Because of the discrete values on both dimensions, a grid (such as grid 400) can be imposed on the 2D space with the finest granularity (such as at granularity of one point). A grid is a pattern of squares in a 2D space. At different orders, a 2D grid includes cells of different sizes. For example, for a 2D grid of size $2^n \times 2^n$ (where "n" represents the order of the grid), at order 0, the grid has 1 cell of size ($2^n \times 2^n$) which is actually the 2D grid itself. At order 1, the grid contains 4 cells each of size $2^{(n-1)} \times 2^{(n-1)}$. At order 2, the grid has 16 cells each of size $2^{(n-2)} \times 2^{(n-2)}$. Each cell or point of the grid corresponds to a pair of coordinates. An exemplary grid shown in FIG. 4 is a grid at order 1, which includes four cells: cell 0, cell 1, cell 2, and cell 3. Cell 0 corresponds to coordinates (0,0), cell 1 corresponds to coordinates (0,1), cell 2 corresponds to coordinates (1,1), and cell 3 corresponds to coordinates (1,0).

Still with reference to FIG. 3, at step 330, space-filling curve values are computed for each pair of 2D coordinates. Space-filling curves are non-intersecting linear curves that pass each cell of the 2D grid once. Space-filling curves impose an order on all cells as they traverse the 2D space. As a result, a space-filling curve value can be assigned to each cell according to its positions on the curves. Although the present invention will be described in the context of the Hilbert Curve, those skilled in the art would understand that other space-filling curves (such as Z-order Curve, Gray-code Curve) can be used to practice the present invention.

Figure 5A:
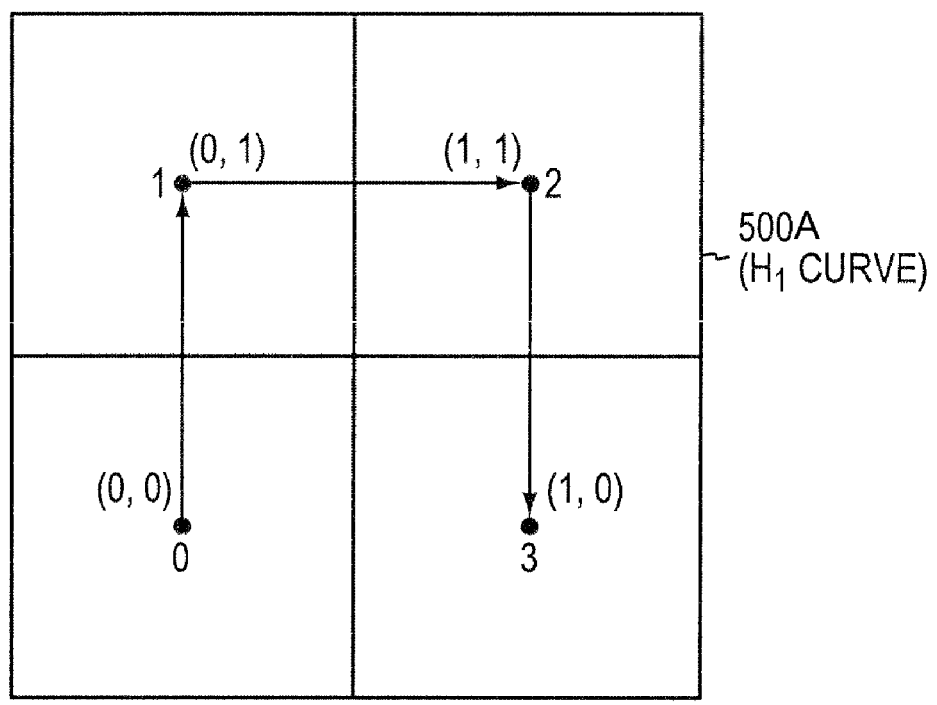
FIGS. 5A-5D are diagrams showing examples of space filling curves, such as a Hilbert curve.

Referring now to FIGS. 5A through 5D, they show known basic Hilbert Curves in a 2×2 grid. The Hilbert curve is a space filling curve that visits every point in a square grid with a size of 2×2, 4×4, 8×8, 16×16, or any other power of 2. The arrows on the grids show how Hilbert Curves traverse the four cells on each grid. For example, in FIG. 5A, the Hilbert Curve enters from the lower left cell 0 and exits from the lower right cell 3 after traversing cell 1 and cell 2. Hilbert Curves values are assigned to each cell based on their positions on the Curve. In FIG. 5A, the lower left cell 0 is the first cell the Hilbert Curve encounters; thus it is assigned a Hilbert Curve value of 0. The upper left cell 1 is the second cell the Hilbert Curve traverses; thus it is assigned a Hilbert Curve value of 1 and so on.

Figure 5B:
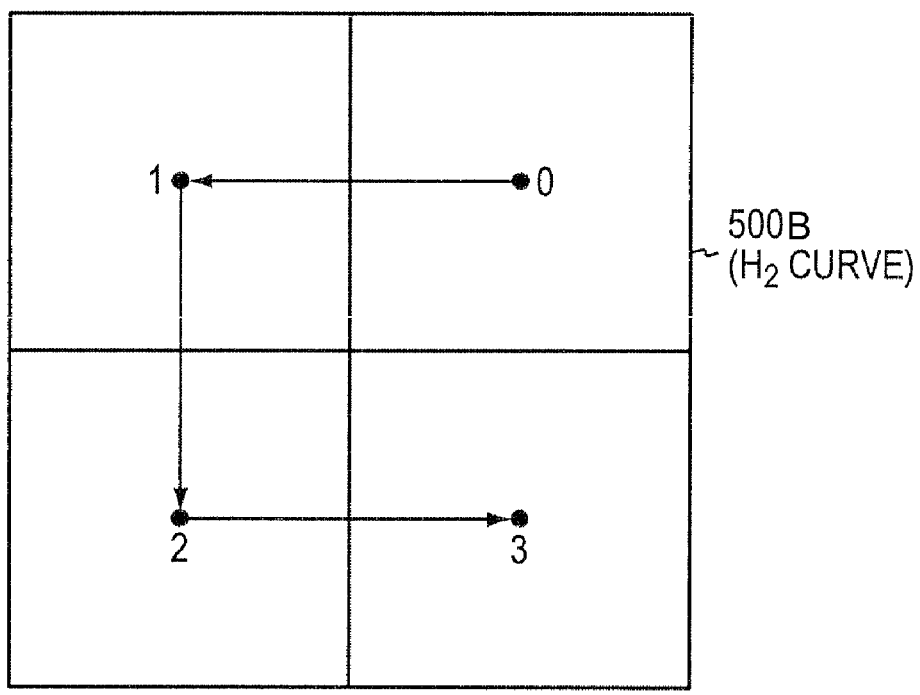

In FIG. 5B, the upper right cell 0 is the first cell the Hilbert Curve encounters; thus it is assigned a Hilbert Curve value of 0. The upper left cell 1 is the second cell the Hilbert Curve comes across; it is assigned a Hilbert Curve value of 1. The bottom left cell 2 is the third cell the Hilbert Curve traverses; thus it is assigned a Hilbert Curve value of 2. The bottom right cell 3 is the fourth cell the Hilbert Curve traverses; thus, it is assigned a Hilbert Curve value 3. Those skilled in the art would understand that Hilbert Curve values can be computed in a similar fashion for Hilbert Curves showed in FIG. 5C and FIG. 5D.

Continuing with the description of Hilbert Curves, Hilbert Curves are typically generated on a $2^n \times 2^n$ grid where "n" is called the order of the Hilbert Curve and can take values of any non-negative integers. In the example described herein, since "size" and "UID" are expressed both as 32-bit integers, n equals 32 and Hilbert values have 64 bits.

Similarly, to generate a Hilbert Curve at order 2, each cell in the 2×2 grid can be replaced with a 2×2 grid and one of the basic curves (shown in FIGS. 5A-5D) can be used to traverse the 2×2 grid. The basic curve transition figures are shown in FIGS. 5E-5H. FIGS. 5E-5H are called basic curve transition figures since they illustrate how a cell should be transitioned (transformed) into a 2×2 grid and which basic Hilbert Curve (H1, H2, H3, or H4) should be used to traverse the new 2×2 grid. In FIGS. 5E through 5H, to generate a 4×4 grid based on a 2×2 grid, each cell in the original 2×2 grid is partitioned into a new 2×2 grid. The dashed lines in FIGS. 5E-5H are basic curves used to traverse these new 2×2 grids (there are four of them since there are 4 cells in the original 2×2 grid). So, the transition figures shown in FIGS. 5E-5H, generate a Hilbert Curve for a 4×4 grid (order=2) from a Hilbert curve for a 2×2 grid (order=1).

Figure 5C:
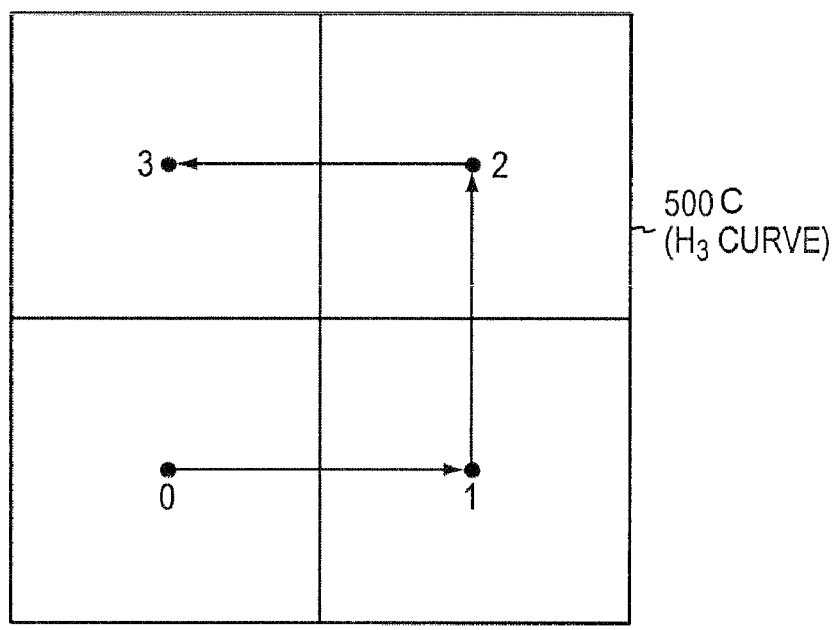
Figure 5D:
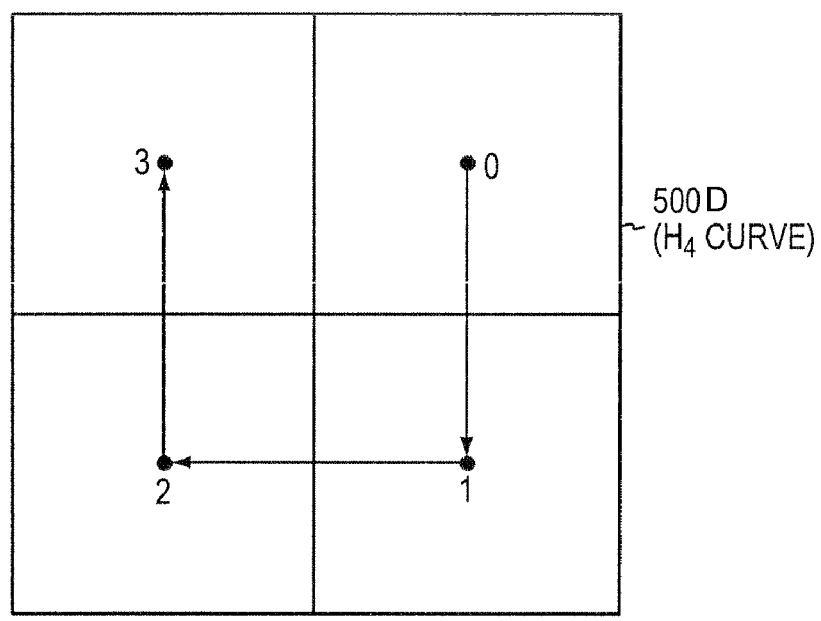
Figure 5E:
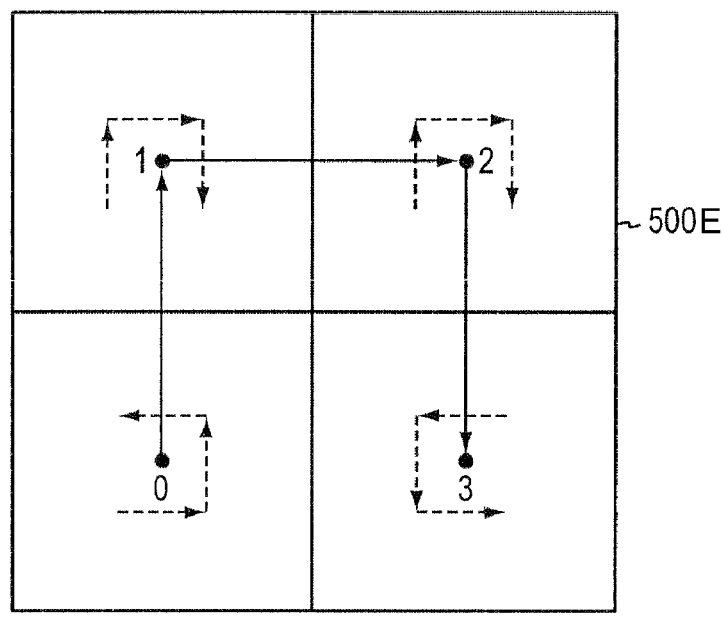
FIGS. 5E-5H are diagrams illustrating transition figures for the Hilbert curve shown in FIGS. 5A-5D.
Figure 5F:
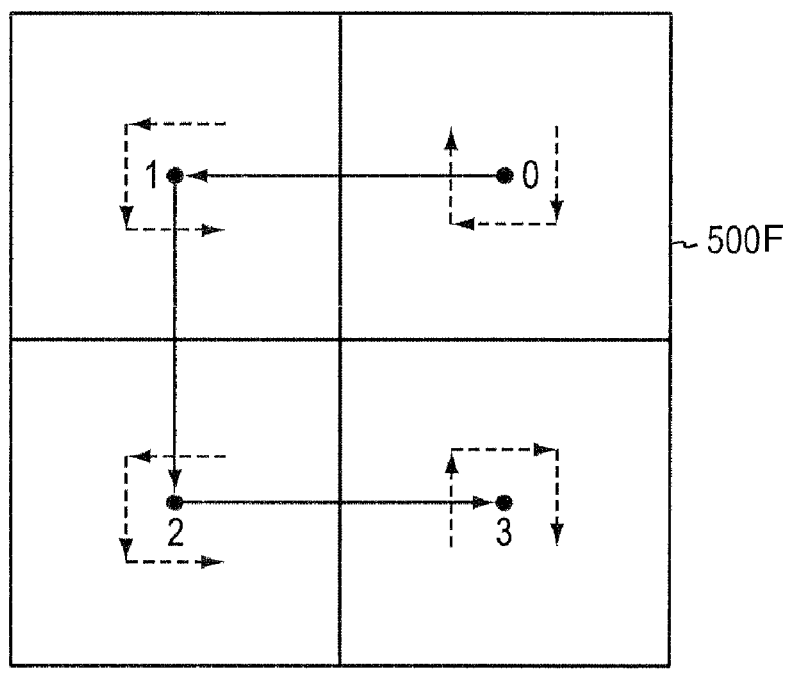
Figure 5G:
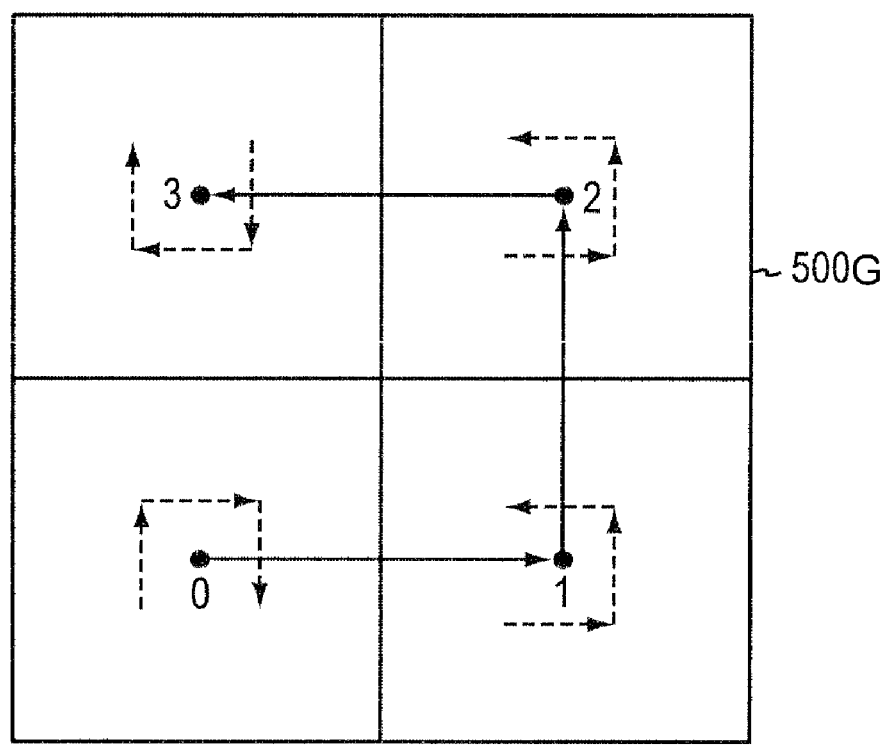
Figure 5H:
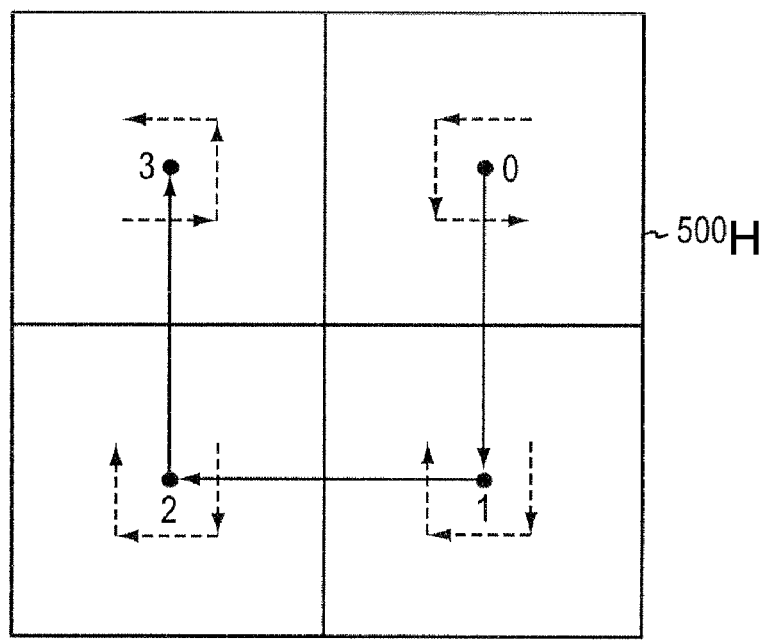

For example, if Hilbert Curve H1 is shown in the grid shown in FIG. 5A, then in FIG. 5E, the upper two cells (1 and 2) use H1 as a curve. The bottom left cell (0) uses H3 as a curve, and the bottom right cell uses H2 as a curve. If the Hilbert Curve used in the previous grid shown in FIG. 5B is H2, then in FIG. 5F, the left two cells (1 and 2) use H2 as well as a curve; the upper right cell (0) uses H4 and the lower right cell (3) uses H1. In FIG. 5G, the upper right cell (2) and the bottom right cell (1) use H2 curve. The upper left cell (3) uses H4 curve and the bottom left cell (0) uses H1 curve. In FIG. 5H, the bottom left and right cell (cells 2 and 1) use H4 curve. The upper left cell (3) uses H3 curve; the upper right cell (0) uses H2 curve.

Figure 6:
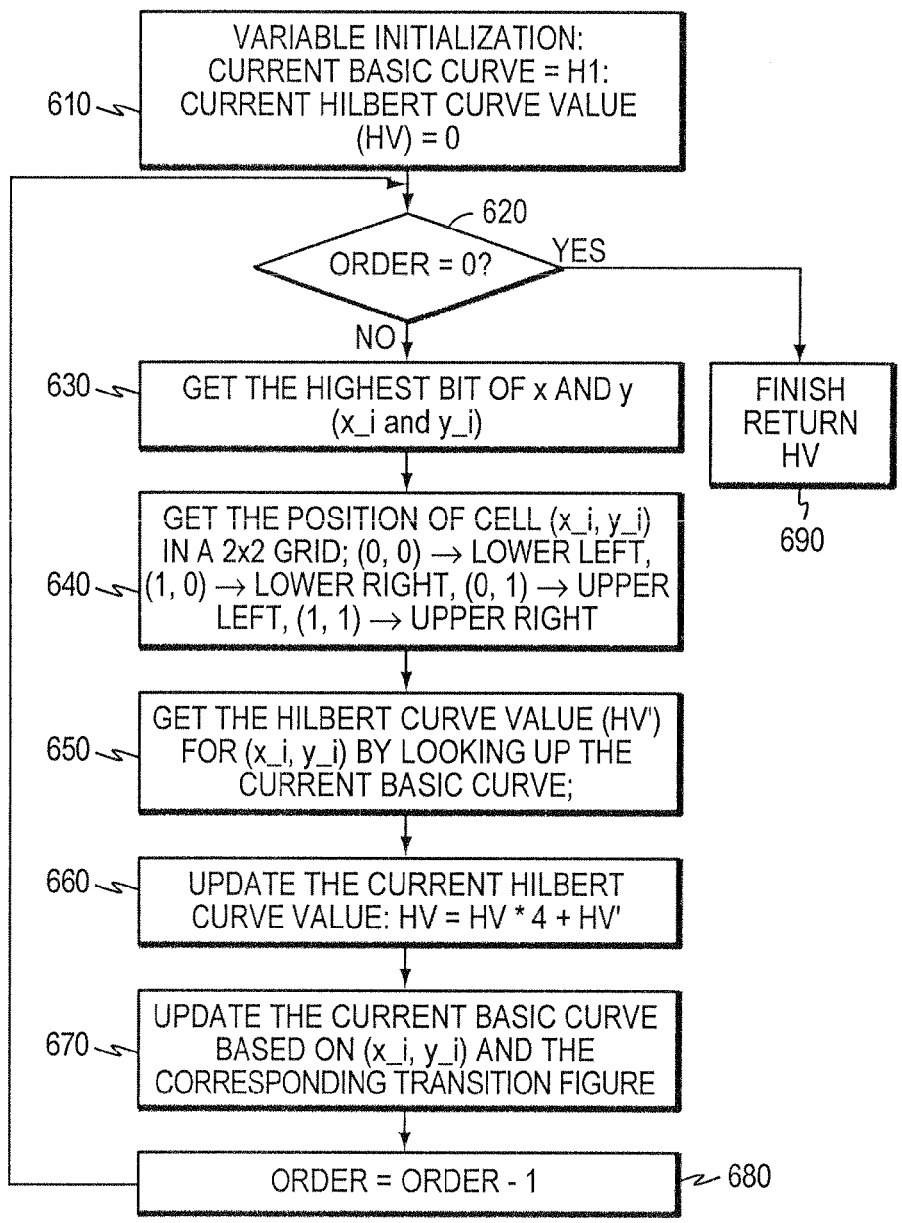
FIG. 6 is a flowchart of a method for computing space-filling curve values.

Referring now to FIG. 6, it illustrates a flowchart of a method for computing Hilbert Curve values. Those skilled in the art would understand that although the present invention is described in the context of computing Hilbert Curve values, other space-filling curves can be employed to compute space filling curve values. The inputs to the method are 2D coordinates (X, Y) and the order of the Hilbert Curve. Based on the order of the Hilbert Curve, the binary representation of X and Y can be determined. Preferably, inputs to the algorithm are of the integer type. The parameter of the order can also be viewed as the total number of bits in X or Y. The output is the Hilbert Curve value at the coordinate of (X,Y). In the below-described algorithm, the lowest bit of X and/or Y is the 1st bit. In one implementation, these steps are performed by the index generation module. To better illustrate the implementation of the algorithm, the following example is provided At step 610, parameters are being initialized. Current basic curve is H1 (it is shown in FIG. 5A). Current Hilbert Curve value (HV)=0. For illustrative purposes the coordinate of a cell is (5,4). The binary representation of "5" is "101" and binary representation of "4" is "100". The order of the Hilbert Curve is 3.

If the order=0 (step 620), then the HV is provided. If the order is not "0" (step 630), then the highest bit of coordinate X and coordinate Y are read. Since in our example, the order=3, the highest bit of X and Y are read. The highest bit of coordinate X is "1" and the highest bit of coordinate Y is "1".

At step 640, the position of cell (1,1) is obtained in a 2×2 grid (such as the one shown in FIG. 5A). The position of cell (1, 1) is upper right.

At step 650, the Hilbert Curve value (HV') for cell (1, 1) is obtained by looking at the current basic curve (such as the one shown in FIG. 5A). The HV' value for cell (1, 1) is "2."

At step 660, the current Hilbert Curve value is updated as follows: HV=HV×4+HV'. In our example, HV=0×4+2=2.

At step 670, the current basic curve H1 is updated based on (1,1) and the corresponding transition figure. Based on the transition figure for curve H1 (FIG. 5E), the current basic curve for cell having coordinates (1,1) is H1.

At step 680, the order is computed as order=order−1. Thus, the current order is 2. The process then loops back to step 610. After executing steps 610 through 680 for the next iteration, the new HV=8 and the basic curve is H3 (H3 is shown in FIG. 5C). The order is now reduced to 0. After repeating steps 610 through 680 for the next iteration, the new HV=33, the basic curve is H3, and the order is reduced to 0. The order is compared to "0" at step 620, and the computation is concluded by returning HV value (step 690).

As Hilbert Curve values are computed for metadata attribute pairs, these values are inserted into a sorted data structure (such as a B+ tree, B−tree, or hash table) as keys.

Figure 7:
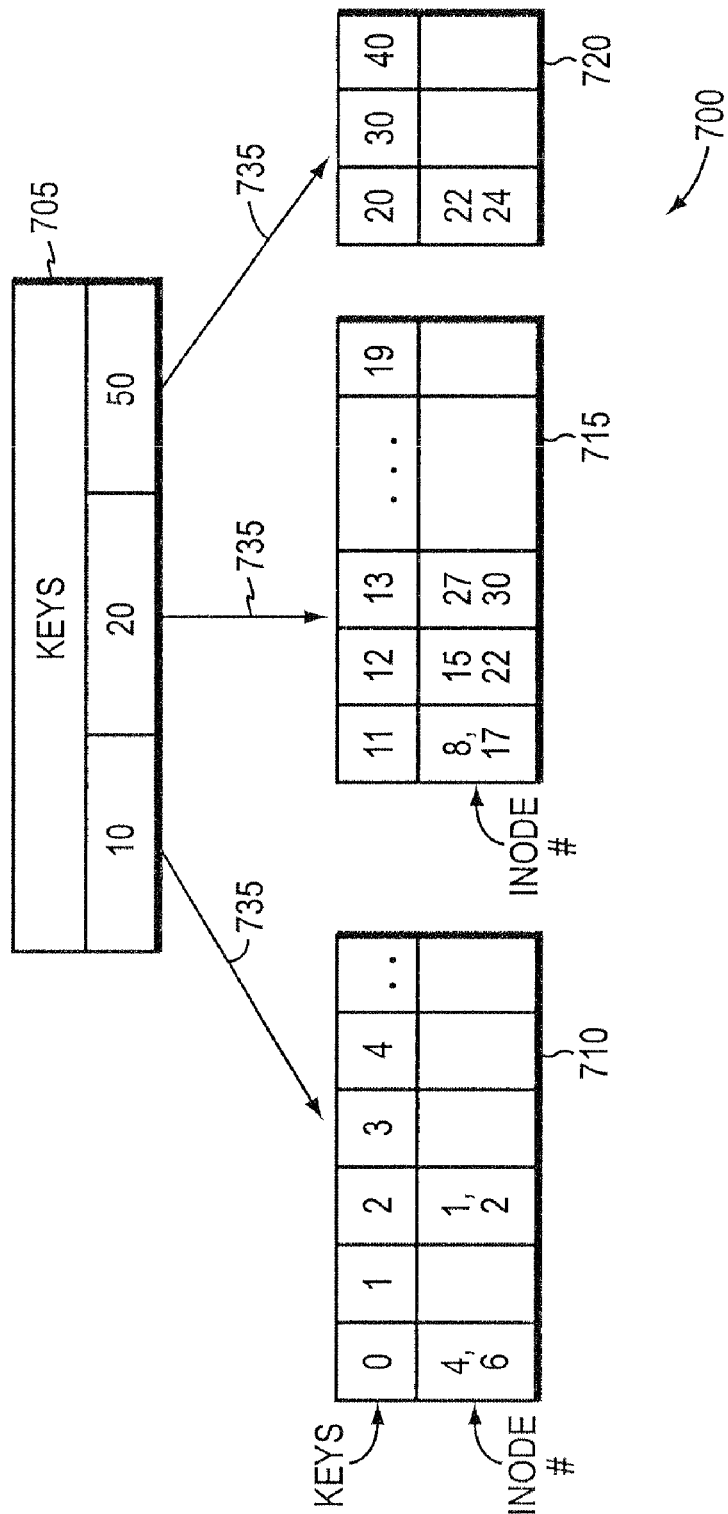
FIG. 7 is a diagram of an index built using space filling curve values according to embodiments of the present invention.

Referring now to FIG. 7, it illustrates a 2D spatial index implemented as a tree-like data structure 700. The data structure 700 includes a plurality of nodes (e.g., 705, 710, 715, and 720). The data structure 700 can be stored in memory 1010 (shown in FIG. 10) or at storage devices 130 (shown in FIG. 1).

A node (e.g., 705, 710, 715, and 720) in the tree-like data structure 700 has zero or more child nodes. A node that has a child is called the child's parent node. A node typically has at most one parent, except for the root node. A parent node is associated with one or more links which point to its child nodes. The pointers indicate a logical association between the parent nodes and the child nodes. For example, node 705 is a root node of the data structure and it is a parent of child nodes 710, 715, and 720. Being the topmost node, the root node 705 does not have parents. Nodes at the bottom most level of the tree are called leaf nodes. An internal node or inner node is any node of a tree 700 that has child nodes and a parent node and thus is not a leaf node. Nodes 710, 715, and 720 shown in FIG. 4 are leaf nodes. The root node is the node at which operations on a tree data structure typically begin. All other nodes can be reached from the root node by following links 735. Exemplary data structure 700 is implemented as a B+ tree, although it can be implemented using any other sorting mechanism. It should be noted that in B+ tree, in contrast to B−tree, all records are stored at the lowest level of the tree.

Thus, as shown in FIG. 7, inode numbers associated with data containers are stored at the leaf nodes 710, 715, and 720 (which are lowest levels of the tree). Furthermore, in a B+ tree, all leaf nodes are at the same distance from the root node.

According to embodiments of the present invention, once a space filling curve value is computed for a pair of attributes in a 2D space, the value is inserted into the tree data structure as a key. A key in the tree data structure can be associated with an identifier, such as an inode number of a data container for which space filling curve value is computed. An exemplary algorithm for inserting a key in a B+ data structure is described below:

1. Starting at the root, perform search to a leaf node;
2. If the key value is in the leaf node, terminate the search.
3. Alternatively, if the key value is not in the leaf node and if there is room in the leaf node, insert the key in the leaf node and stop the search.
4. If there is no room in the leaf node, allocate a new leaf node.
5. Redistribute the keys and pointers such that half of the keys are in the existing child node and half of the keys are in the new leaf node. If there is an odd number of keys, insert the extra key in the existing child node. Order the keys so that the smaller ones go into the existing child node and the larger ones go into the new node. All the keys in the existing child node will be smaller than any key in the new node.
6. Duplicate the smallest key in the new child node into the parent non-leaf node.
7. If there is no parent node, create a new root node, create the pointers and stop the process. If there is room in the parent node, adjust the pointers and stop the process.
8. If the parent node is full, allocate a new non-leaf node.
9. Redistribute the keys that were in the old non-leaf node, plus the new key, into the two non-leaf nodes, except the middle-valued key. Move the middle-valued key up the tree into the parent node. If there is an odd number of keys to be redistributed into the two nodes, put the extra one in the old (left) non-leaf node.
10. Proceed to step 7.

As shown in FIG. 7, a key inserted into the spatial index (tree data structure 700) can be associated with more than one inode number since a Hilbert Curve value can be the same for more than one pair of attributes, as illustrated in Table 2:

TABLE 2

Exemplary Hilbert Curve Values at order 1 computed for Attribute 1 (Size) and Attribute 2 (UID)

| Inode Number | Attribute 1 (size) | Attribute 2 (UID) | Hilbert Curve Value |
|---|---|---|---|
| 4 | 0 | 1 | 0 |
| 6 | 0 | 1 | 0 |
| 3 | 1 | 0 | 3 |
| 2 | 1 | 1 | 2 |
| 1 | 1 | 1 | 2 |

As shown in Table 1, Hilbert Curve Value=0 is the same for inode#4 and inode#6. Similarly, Hilbert Curve Value=2 is the same for inode#2 and inode#1. Accordingly, as illustrated in FIG. 7, key "0" is associated with inode numbers 4 and 6 and key "2" is associated with inode numbers 1 and 2.

As shown in FIG. 7, in the illustrative search tree 700 (in one implementation, a B+ tree) 700, node 710 is associated with keys having values in the range of greater than 0 and less or equal than 10; node 715 is associated with keys having values in the range of greater than 10 and less or equal than 20; node 720 is associated with keys having values in the range of greater than 20 and less or equal than 50.

As will be described in more detail below, the created index provides for lower selectivity since it eliminates the need to process undesirable number of index entries (keys and associated inode numbers) to perform a search in response to a query.

Searching Index

Figure 8:
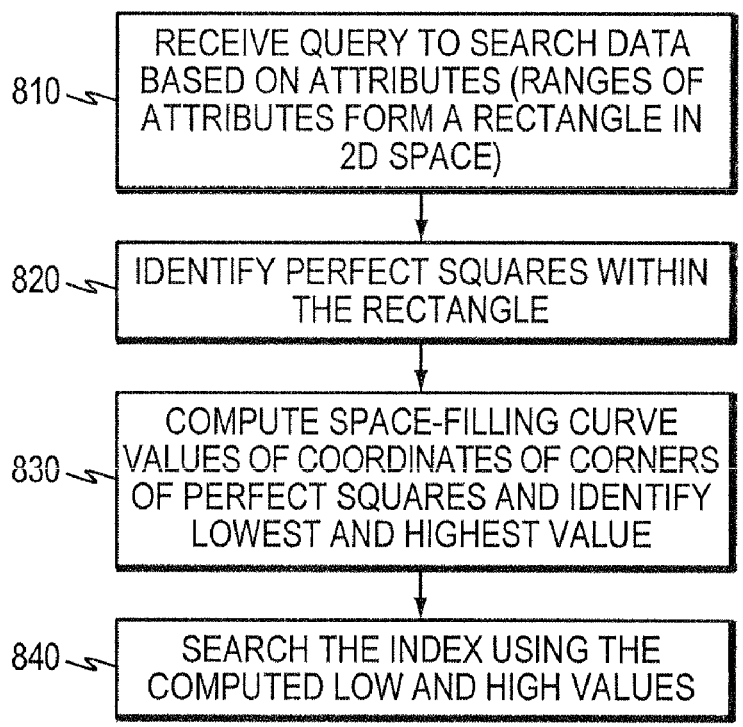
FIG. 8 is a flowchart of a method for searching the index shown in FIG. 7 according to embodiments of the present invention.

Referring now to FIG. 8, it illustrates steps performed by the index generation module to search the 2D spatial index shown in FIG. 7. Briefly, first a query search is received. Typically, a query based on two predicates includes ranges of attribute values. These ranges can be expressed as a region in a 2D space of possible query matches. Space-filling curve values (such as Hilbert values) are then computed for the region. A novel optimization technique is described that provides for fewer computations to compute space-filling curve values. The computed values are used as keys to search the created spatial index for data containers associated with the keys. These steps will be described in greater detail herein.

Initially, at step 810, a query based on more than one attribute is received by the index generation module 1110. Typically, all predicates of the query have the general form of "Low<=attribute<=High". The ranges of attributes form a region (such as a rectangle). If, however, Low and High are equal, the predicate is "attribute=value", then the represented region is a cell. Values of non-discrete numerical attributes are converted into integer values. For example, as described herein, if one of the attributes is extension ("ext") of a data container, the index generation module converts the values of the extensions to integer values. In one implementation, mapping table 1135 can be used to find a unique integer mapped to a unique extension. The mapping table 1135 can be stored in memory 1010 shown in FIG. 10.

Figure 9:
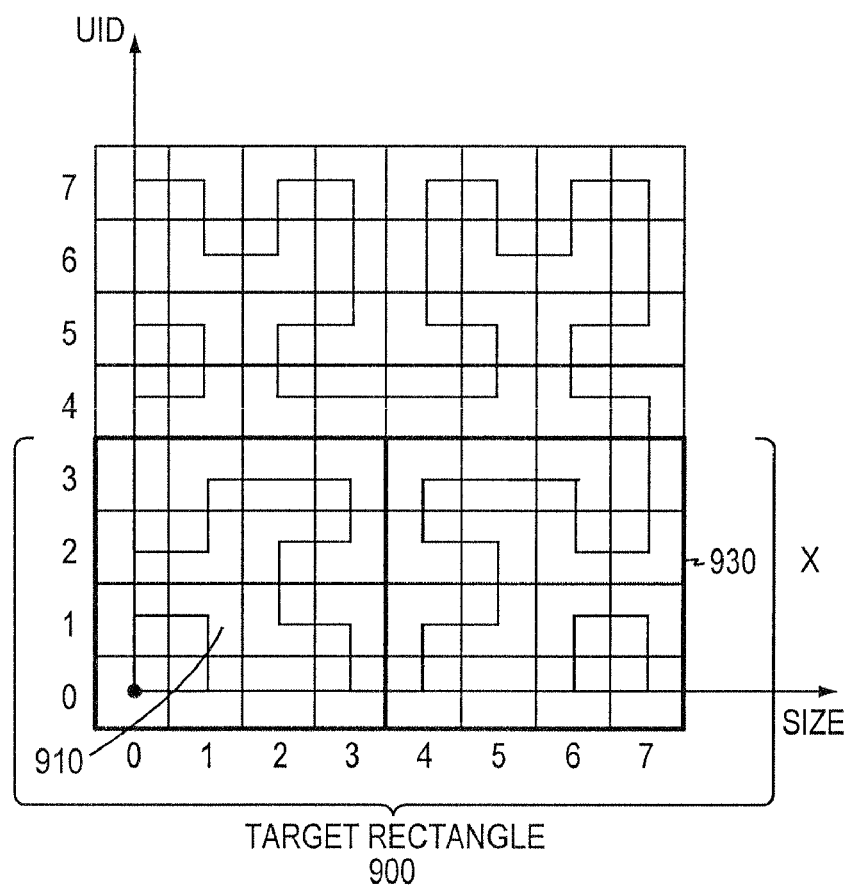
FIG. 9 is a diagram showing "perfect squares" within the space filling curve according to embodiments of the present invention.

For example, a spatial index is created for attribute 1 (Size) and attribute 2 (UID) and the coordinates are represented as (value of attribute 1, value of attribute 2). A query may include two predicates to search on attribute 1 and attribute 2. A predicate may include a range on which data containers need to match. For example, predicates of "Low1<=attribute 1<=High Value 1" and "Low2<=attribute 2<=High Value 2" form a region in the 2D space with (Low1, Low2) as its lower left corner and (High Value 1, High Value 2) as its upper right corner. As an illustrative example, one of the predicates in the query may include the following range for attribute 1 (size): 0<=size<=7 and another predicate may include the following range for attribute 2 (UID): 0<=UID<=3. These predicates form a target region (such as target rectangle 900 shown in FIG. 9). For example, as shown in FIG. 9, the rectangle may have the low left corner coordinates (0,0) and the upper right corner coordinates (7, 3). As shown in FIG. 9, the target rectangle includes multiple cells (specifically, in the rectangle shown in FIG. 9 there are 32 cells). To compute Hilbert values for the target rectangle, Hilbert values for each cell in the target rectangle need to be calculated. These values can be used as keys to search for data containers associated with Hilbert values in the spatial index (e.g., 700). Computing Hilbert values for each cell, however, may incur unnecessary Hilbert Curve value computations.

According to embodiments described herein, rather than computing Hilbert Values for each cell within the target region that includes all possible query matches, a more efficient method first identifies one or more "perfect square" within the target region (e.g., 900) and computes Hilbert values only for corner cells of each perfect square. As will be described in more detail herein, this approach significantly reduces a number of Hilbert value computations that would have to be performed otherwise.

A "perfect square" can be defined as a shape having the lower left coordinate (X_0, Y_0) and upper right coordinate (X_1, Y_1), which satisfy the following requirements:

1. The longest highest m (0<=m<=n) bits of X_0 and X_1 are the same. The remaining (n through m) bits of X_0 are all 0, and the rest (n through m) bits of X_1 are all 1, wherein "n" represents the total number of bits of X and/or Y.

2. The longest highest m (0<=m<=n) bits of Y_0 and Y_1 are the same. The remaining (n through m) bits of Y_0 are all 0, and the remaining (n through m) bits of Y_1 are all 1.

3. The length of the matched highest bits of X and Y are equal.

If such "m" exists for a rectangle so that the coordinates of the rectangle meet the above requirements, then such a rectangle is called a perfect square of size $2^m \times 2^m$, i.e. a cell at the order of (n−m).

In the perfect square, the lowest and highest Hilbert Values are located at the corners of the square. Therefore, in order to compute Hilbert Values for the rectangle or a region in the 2D space with (Low1, Low2) as its lower left corner and (High 1, High 2) as its upper right corner, only four Hilbert Value computations for each perfect square need to be performed (step 830). After all perfect squares are identified, Hilbert Value ranges are computed for each square. These computations can be performed using, for example, the algorithm described in connection with FIG. 6. It should be noted that computing four Hilbert Curve Values for each perfect square in the target region involves significantly less computations than computing Hilbert Curve Values for each cell within the region.

The following example illustrates how a perfect square is identified in a rectangle. First, a determination is made as to whether target rectangle 900 is a perfect square. The lower left coordinate (X_0, Y_0) and upper right coordinate (X_1, Y_1) are (0, 0) and (7, 3) respectively. Applying the conditions shown above:

1. The binary representation of coordinate (0,0) is (000, 000). The binary representation of coordinate (7, 3) is (111, 011).

2. Since no bits are the same between X_0 and X_1 and Y_0 and Y_1, none of the conditions of the perfect square are met. Thus, target rectangle shown in FIG. 9 is not a perfect square.

A next step would be to split the target rectangle into two areas along $2^K$ lines, where "K" equals ((n−m)−1). In the illustrated example, m=0, n=3, thus K=2.

After splitting the target rectangle into the two areas (910) and (930), the low coordinates of the first area (910) are (X_0=0, Y_0=0) and the high coordinates of the first area are (X_1=3, Y_1=3). Within the second area (930), the lower coordinates are (X_0=4, Y_0=0) and the high coordinates (X_1=7, Y_1=3).

Using the conditions that a perfect square has to meet, a determination needs to be made as to whether the second area (930) is a perfect square. First, low and high coordinates of the area need to be converted into binary representation. Since the order of the target rectangle shown in FIG. 9 is "3", the binary representation of the lower and high coordinates of the rectangle are as follows: (X_0=100, Y_0=000) and (X_1=111, Y_1=011).

1. A comparison of the bits of X_0 and X_1 of coordinates 100 and 111 need to be performed. The first highest bits are the same (e.g., "1"). The rest of the bits of the coordinate X_0 are "0". The rest of the bits of the coordinate X_1 are "1". Thus, the first condition is satisfied.

2. A comparison of the bits of Y_0 and Y_1 coordinates 000 and 011 needs to be performed. The first highest bits are the same (e.g., "0"). The rest of the bits of the coordinate Y_0 are "0". The rest of the bits of the coordinate Y_1 are "1". Thus, the second condition is satisfied.

Since both conditions are satisfied, area 930 is a perfect square. After all perfect squares are identified, Hilbert Value ranges are computed for each square.

As described herein, in the perfect square, the lowest and highest Hilbert Values are located at the corners of the square. Therefore, in order to compute Hilbert Values for the perfect square 930, only four Hilbert values need to be computed for the cells having the following coordinates: (4,0), (7,0), (4,3), and (7,3). Computing only four Hilbert values for a perfect square involves fewer computations in comparison to calculating Hilbert values for each cell within the target rectangle. Once the Hilbert Values are computed for perfect squares, the lowest and the highest values are selected. These two Hilbert Curve values are used as a key range to search the 2D spatial index (e.g., data structure 700) for the data containers associated with the keys that fall within the range.

As is known in the art, searching a tree-like data structure (such as a B-tree), can be performed using various algorithms, such as a depth-first approach. According a depth-first algorithm, a root node of the tree (e.g., 705) is visited first. Then, using the pointers (e.g., 735) within the root node, internal nodes (e.g., nodes that have child nodes) are searched to identify keys that are greater than the lower range of the search. Then, using the links, leaf nodes (to which the visited internal node points) are searched for data containers associated with the keys that are greater than the low range and less or equal than the upper range of the key range. The keys that fall within the searched ranged are provided to the requestor (via, for example, user interface module) along with associated inode numbers.

As an example, assuming for one perfect square, Hilbert curve values are in the range between "10" and "20". To identify data containers associated with the keys in this range, first the root of the tree data structure (700) is searched. Then, the node that contains keys greater than to the low range (e.g., "10") is analyzed (such as node 715). Since node 715 is a leaf node (it does not have child nodes), this node is searched for keys that are greater than "10" until the key less or equal to "20" is found. All the inode numbers associated with the keys failing in the range of 10 through 20 are provided to the requestor (e.g., a system administrator).

Thus, embodiments of the present invention provide mechanisms that overcome limitations of existing single-attribute and multi-attribute indexes by creating two-dimensional (2D) spatial indexes that are used to search for fewer index entries in response to a query on two or more metadata attributes. Such 2D indexes are created by representing selected metadata attribute pairs describing a data container as dimensions in a 2D space so that a data container can be expressed as a point or a cell in a 2D space. The coordinates of a data container are a pair of values of the metadata attributes. A space filling curve is applied to traverse the 2D space and convert each pair of the 2D coordinates to a space filling curve value. A 2D spatial index is then created based on the computed space filling curve values so that a space filling curve value can be associated with one or more data containers in the index. When a query based on two attributes (for which an index is created) is received, space filling curve values are computed for the area in the 2D space that includes all possible query matches. The computed values are used as keys to search the index for data containers matching the query on two metadata attributes.

Those skilled in the art would understand that although the novel mechanisms are described in connection with queries on two attributes, the inventive techniques can be used to efficiently perform searches on more than two attributes. For example, if a query on three attributes is received and a spatial index is created for two attributes in the query, the third attribute can be used as a filter to eliminate index entries that do not match the third attribute. If a query based on four attributes is received, and two spatial indexes exist for two pairs of the attributes in the query, each index is first searched separately. Then, an intersection operation can be applied to the results of both searches to find entries that match all four attributes in the query.

Since the created spatial index can be used to search for records that match on multiple predicates, the created spatial indexes provide for lower selectivity so that fewer index entries are searched. Furthermore, unlike existing multi-attribute indexes, the spatial indexes described herein do not assign "importance" to a particular attribute, thereby making the spatial indexes more desirable to employ.

Storage System

Figure 10:
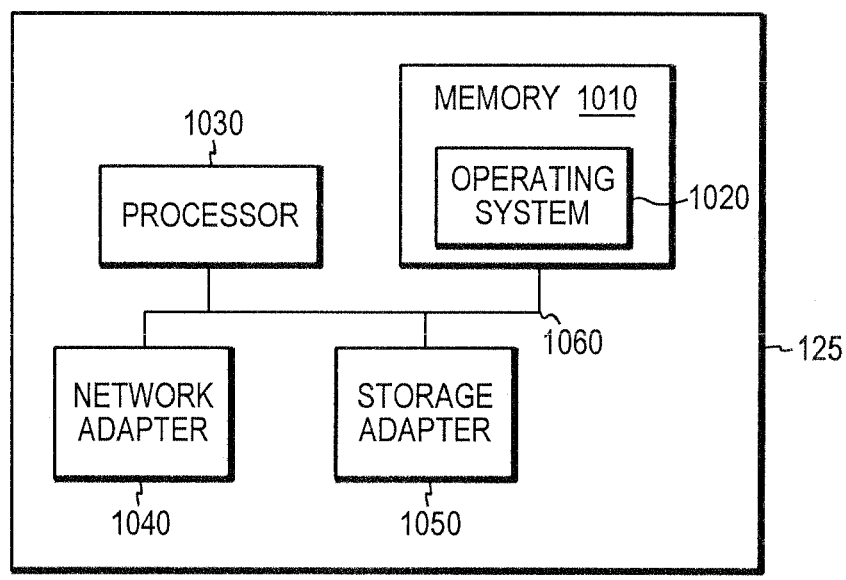
FIG. 10 is a diagram of components of a storage system shown in FIG. 8.

Referring now to FIG. 10, it illustrates various components of storage system 125 shown in FIG. 1 for which the invention may find practical application as noted above. Storage system 125 is an apparatus that provides storage service relating to the organization of data on storage devices, such as disks 130 of array 160. Storage system 125 illustratively comprises a processor 1030, a memory 1010, one or more network adapters 1040 and one or more storage adapters 1050 interconnected by a system bus 1060. Each network adapter 1040 comprises the mechanical, electrical and signaling circuitry needed to connect the storage system 125 to clients 110 over the network 120. Storage system 125 also includes an operating system 1020 that interacts with various modules, which are shown in more detail in FIG. 11. The processor and adapters may, in turn, comprise processing elements and/or logic circuitry configured to execute the software code and manipulate the data structures. It will be apparent to those skilled in the art that other processing and memory means, including various computer readable media, may be used for storing and executing program instructions pertaining to the inventive technique described herein.

The storage adapter 1050 cooperates with the operating system 250 executing on storage system 125 to store and retrieve data requested on any type of attached array of writable storage device media such as video tape, optical, DVD, magnetic tape, bubble memory, electronic random access memory, micro-electro mechanical and any other similar media adapted to store data and parity. However, as illustratively described herein, the data is preferably stored on the disks 130, such as HDD and/or DASD, of local storage array 160. The storage adapter includes input/output (I/O) interface circuitry that couples to the disks over an I/O interconnect arrangement, such as a conventional high-performance, FC serial link topology. In the illustrative embodiment, the memory 1010 comprises storage locations that are addressable by the processor and adapters for storing software program code, such as operating system 1020.

Storage Operating System

Figure 11:
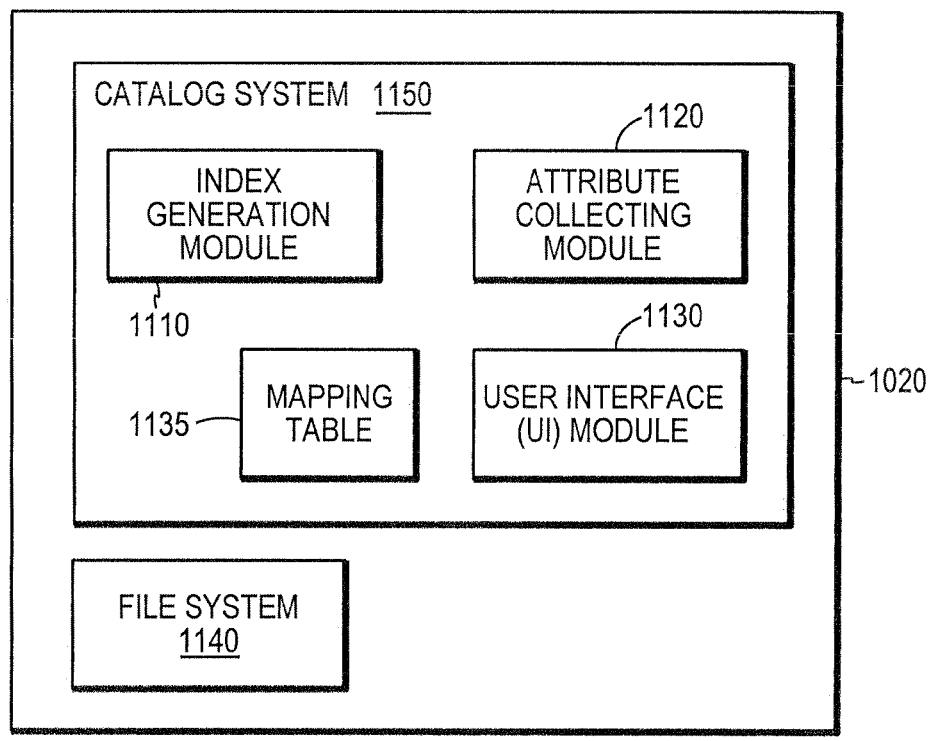
FIG. 11 is a diagram of components of an operating system of the storage system shown in FIG. 1 according to embodiments of the present invention.

FIG. 11 is a schematic block diagram of components of a storage operating system 1020 of storage system 125 that may be advantageously used with embodiments of the present invention.

In the illustrative embodiment, the storage operating system 1020 can be the NetApp® Data ONTAP™ operating system available from NetApp Inc., of Sunnyvale, Calif., that implements a Write Anywhere File Layout (WAFL™) file system, such as file system 1140. However, it is expressly contemplated that any appropriate file system may be enhanced for use in accordance with the inventive principles described herein. As used herein, the term "storage operating system" generally refers to the computer-executable code operable on a computer that manages data access. The storage operating system 1020 can be implemented as an application program operating over a general-purpose operating system, such as UNIX® or Windows NT®, or as a general-purpose operating system with configurable functionality, which is configured for storage applications as described herein.

The storage operating system 1020 further executes a catalog system 1150, which includes the index generation module 1110, user interface module 1130, and attribute collecting module 1120. User interface module 1130 is configured to receive inputs by a user at system administrator console 128. Such inputs may include, for example, a list of attributes to generate an index and a query to search the index. Index generation module 1110 is configured to generate a 2D spatial index (such as the one shown in FIG. 7). For example, index generation module 1110 is responsible for receiving selected attributes from the user interface module 1130 and employ the attribute collecting module 1120 to search inode data structures corresponding to a data container (e.g, inode data structure 200 shown in FIG. 2) to gather values for the selected attributes. These values are provided to the index generation module 1110 along with an inode number associated with a data container. Index generation module 1110 can be further configured to represent pairs of attribute values as coordinates in a 2D space and to compute space filling curve values for each pair using, for example, the algorithm described in reference to FIG. 6. Furthermore, index generation module 1110 is responsible for generating a 2D space-filling index based on the computed space filling curve values.

Although the present invention for purpose of explanation has been described with reference to specific exemplary embodiments, it will be understood that the invention is not limited to the embodiments described. A person of ordinary skill in the art would understand that the present invention can be practiced with modifications and alternations to those embodiments or can be practiced in other embodiments within the spirit and scope of the appended claims.

Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or system.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by apparatuses for performing the operations herein. These apparatuses may be specially constructed for the required purposes or they may comprise a machine, such as a general-purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A method for generating an index for searching data containers in a storage system, comprising a processor and a memory, based on selected metadata attributes, the method comprising:
    mapping, for a given data container of a plurality of data containers, a pair of values corresponding to a pair of attributes associated with metadata describing the given data container that stores data, wherein the pair of values represent coordinates for the given data container in a two-dimensional (2D) space;
    imposing a grid comprising a plurality of cells on the 2D space so that each cell in the grid represents coordinates of a single data container of the plurality of data containers in the 2D space;
    computing a space filling curve value for each cell in the grid;
    generating a searching index wherein each computed space filling curve value is used as a key in the searching index to search for the plurality of data containers in the storage system;
    receiving a query to search for one or more particular data containers based on ranges of metadata values of selected attributes;
    computing particular space-filling curve values based on the ranges of metadata values of selected attributes associated with the query; and
    searching the searching index to identify the one or more particular data containers based on the particular space-filling curve values.

2. The method of claim 1, further comprising:
    receiving the selected attributes; and
    searching data structures storing metadata for the one or more particular data containers associated with the values corresponding to the selected attributes.

3. The method of claim 1, further comprising:
    determining whether an attribute value has an integer value; and
    responsive to the attribute value not being a discrete integer, converting the attribute value to the integer value.

4. The method of claim 1, wherein the space filling curve is at least one of a Hilbert Curve, a Peano Curve, a Z-order Curve, and a Gray-code Curve.

5. The method of claim 1,
    wherein the ranges represent a region having four coordinates in the 2D space, one or more perfect squares within the region are identified, and a highest value and a lowest value among the computed particular space-filling curve values for corner cells in each of the one or more perfect squares are identified to search the generated index to identify the one or more particular data containers.

6. The method of claim 5, wherein identifying one or more perfect squares further comprising identifying an area having a lower left coordinate ($X\_0, Y\_0$) and an upper right coordinate ($X\_1, Y\_1$), which meet the following criteria:
    highest bits of $X\_0$ and $X\_1$ being a same and remaining bits of $X\_0$ being all 0 and remaining bits of $X\_1$ being 1;
    highest bits of $Y\_0$ and $Y\_1$ being a same and remaining bits of $Y\_0$ being all 0 and remaining bits of $Y\_1$ being 1; and
    length of a matched highest bits of X and Y are equal.

7. The method of claim 1, further comprising using the searching index to identify the one or more particular data containers corresponding to keys in the index.

8. The method of claim 1, further comprising:
    receiving the query to search for the one or more data containers based on N number of attributes, where N is an even number;
    responsive to finding searching indexes for any pair of attributes of the N number of attributes in the query, using each of the searching indexes to identify the one or more particular data containers matching the query; and
    applying a logical function to the one or more particular data containers to identify one or more data containers that match all attributes in the query.

9. The method of claim 8, wherein the logical function is an intersection function.

10. The method of claim 1, further comprising:
    receiving the query to search for the one or more particular data containers based on N number of attributes, where N is an odd number;
    responsive to identifying searching indexes for any pair of attributes of the N number of attributes in the query, using each of the searching indexes to identify the one or more particular data containers corresponding to the query;
    applying a logical function to the one or more particular data containers to identify selected data containers that match an even number of attributes in the query; and
    using remaining attribute as a filter to identify one or more data containers that match all the attributes in the query.

11. A method for computerized searching of data containers on a storage system having a processor and a memory, comprising:
    maintaining metadata describing a plurality of attributes associated with each data container of the data containers that stores information, wherein each attribute has an associated value;
    representing a pair of values corresponding to a pair of attributes of the plurality of attributes associated with a given data container as dimensions in a two-dimensional (2D) space so that the pair of the selected values corresponding to the pair of attributes represents coordinates for a given data container in the 2D space;
    imposing a grid comprising a plurality of cells on the 2D space so that each cell in the grid represents coordinates of a single data container in the 2D space;
    computing a space filling curve value for each cell in the grid;
    generating a searching index wherein each computed space filling curve value is used as a key in the searching index;
    receiving a query to search for one or more data containers based on ranges of metadata values of selected attributes; and
    searching the searching index for the one or more data containers based on a match between particular space-filling curve values associated with the range of metadata values of selected attributes and one or more keys in the searching index.

12. A catalog system for generating an index for searching data containers stored in a computerized system, comprising a processor and a memory, the method comprising:

an attribute collecting module configured to collect values associated with selected metadata attributes from a data structure storing metadata for a plurality of data containers;

an index generation module configured to represent the selected attributes as dimensions in a two-dimensional (2D) space so that a pair of values corresponding to a pair of selected metadata attributes represent coordinates of a given data container in the (2D) (2D) space having a plurality of cells where each cell represents a single data container in the 2D space, to compute a space filling curve value for each cell; and to generate a searching index wherein each computed space filling curve value is used as a key in the searching index, wherein a match between one or more keys in the searching index and particular space-filling curve values associated with a range of metadata values of selected attributes identifies one or more particular data containers.

13. The catalog system of claim 12, further comprising a mapping table stored in the memory of the computerized system and configured to map values of non-integer attributes to integer values.

14. The catalog system of claim 12, wherein the index generation module is further configured to use the searching index to identify selected data containers corresponding to the searching index.

15. A non-transitory computer-readable medium containing executable program instructions executed by a processor, comprising:

program instructions that map, for a given data container of the plurality of data containers, a pair of values corresponding to a pair of attributes associated with metadata describing the given data container that stores data, wherein the pair of values represent coordinates for the given data container in a two-dimensional (2D) space;

program instructions that impose a grid comprising a plurality of cells on the 2D space so that each cell in the grid represents coordinates of a single data container in the 2D space;

program instructions that compute a space filling curve value for each cell in the grid;

program instructions that generate a searching index wherein each computed space filling curve value is used as key in the searching index to search for one or more data containers;

program instructions that receive a query to search for the one or more data containers based on ranges of metadata values of selected attributes;

program instructions that compute particular space-filling curve values based on the ranges of metadata values of selected attributes associated with the query; and searching the searching index to identify the one or more data containers based on the particular space-filling curve values.

16. The non-transitory computer-readable medium of claim 15, wherein the ranges represent a region having four coordinates in the 2D space, and further of comprising:

program instructions that identify one or more perfect squares within the region, and a highest value and a lowest value among the computed particular space-filling curve values for corner cells in each of the one or more perfect squares are to search the generated index to identify the one or more data containers.

17. The non-transitory computer-readable medium of claim 15, further comprising program instructions that collect values of selected metadata attributes from a data structure storing metadata for the one or more data containers.

18. The non-transitory computer-readable medium of claim 15, wherein an identifier associated with a particular key in the searching index is an inode number of a particular data container.

19. The non-transitory computer-readable medium of claim 15, wherein the generated searching index is a tree-like data structure.

20. The non-transitory computer-readable medium of claim 15, wherein a particular key in the generated searching index is associated with one or more selected data containers.

* * * * *

UNITED STATES PATENT AND TRADEMARK OFFICE
CERTIFICATE OF CORRECTION

PATENT NO. : 8,219,564 B1
APPLICATION NO. : 12/111530
DATED : July 10, 2012
INVENTOR(S) : Shao et al.

It is certified that error appears in the above-identified patent and that said Letters Patent is hereby corrected as shown below:

Col. 3, line 1 should read: "Fig. 2 is a block diagram of ~~mode~~inode data structure including"

Col. 4, line 13 should read: "kilobyte (KB) data blocks, and using ~~modes~~inodes to describe the"

Col. 4, line 14 should read: "data containers. An ~~mode~~inode is a data structure, e.g., a 128-byte"

Col. 4, line 20 should read: "disk, as described below. An ~~mode~~inode number refers to a pointer"

Col. 4, line 21 should read: "of an ~~mode~~inode data structure."

Col. 4, line 22 should read: "Referring now to Fig. 2, it illustrates an exemplary ~~mode~~inode"

Col. 4, line 26 should read: "metadata section 210 of each ~~mode~~inode describes a data container"

Col. 17, line 9 should read: "given data container in the 2D ~~2D~~ space having a"

Signed and Sealed this
Twenty-eighth Day of August, 2012

David J. Kappos
*Director of the United States Patent and Trademark Office*